(12) United States Patent
Chen et al.

(10) Patent No.: US 9,199,659 B2
(45) Date of Patent: Dec. 1, 2015

(54) RETRACTABLE RACK

(71) Applicant: LERADO (ZHONG SHAN) INDUSTRIAL CO., LTD., Zhong Shan, Guang Dong Province (CN)

(72) Inventors: Lung-Sheng Chen, Tainan (TW); Yu-Tung Lin, New Taipei (TW); Ho-Sheng Chen, Chiayi County (TW)

(73) Assignee: LERADO (ZHONG SHAN) INDUSTRIAL CO., LTD, Zhong Shan, Guang Dong Province (CN)

( * ) Notice: Subject to any disclaimer, the term of this patent is extended or adjusted under 35 U.S.C. 154(b) by 0 days.

(21) Appl. No.: 14/103,104

(22) Filed: Dec. 11, 2013

(65) Prior Publication Data

US 2014/0159358 A1     Jun. 12, 2014

(30) Foreign Application Priority Data

Dec. 12, 2012 (CN) ...................... 2012 2 0682029 U

(51) Int. Cl.
*B62B 9/28* (2006.01)
*B62B 7/14* (2006.01)
*B62B 9/12* (2006.01)

(52) U.S. Cl.
CPC . *B62B 7/145* (2013.01); *B62B 9/12* (2013.01); *B62B 9/28* (2013.01)

(58) Field of Classification Search
USPC ................. 280/769, 642, 647, 650, 657, 658, 280/47.38; 297/256.16, 256.17
See application file for complete search history.

(56) References Cited

U.S. PATENT DOCUMENTS

| 4,449,732 | A  | * | 5/1984 | Surot ............................ 280/644 |
| 4,892,327 | A  | * | 1/1990 | Cabagnero .................... 280/650 |
| 6,099,022 | A  | * | 8/2000 | Pring ............................ 280/648 |
| 6,626,452 | B2 | * | 9/2003 | Yang et al. .................... 280/643 |
| 2002/0056973 | A1 | * | 5/2002 | Yang et al. ..................... 280/647 |
| 2002/0063450 | A1 | * | 5/2002 | Washizuka et al. ........... 297/130 |
| 2003/0111825 | A1 | * | 6/2003 | Lo et al. ........................ 280/642 |
| 2010/0244519 | A1 | * | 9/2010 | Dingler et al. ........... 297/256.16 |

* cited by examiner

*Primary Examiner* — Frank Vanaman
(74) *Attorney, Agent, or Firm* — Muncy, Geissler, Olds & Lowe, P.C.

(57) ABSTRACT

A retractable rack includes a connecting part, a holding mount, a first support element, a second support element and a positioning mechanism. The connecting part may detachably attach to a stroller frame. The second support element is retractably mounted on the opposite side of the holding mount and capable of selectively locking in a first position and a second position relative to the first support element. The positioning mechanism is mounted in the holding mount for locking the second support element in the positions. When the second support element is locked in the first position, the retractable rack is capable of supporting and connecting a car seat with a first size, and when the second support element is locked in the second position, the retractable rack is capable of supporting another car seat with a second size to the stroller frame.

8 Claims, 6 Drawing Sheets

RETRACTABLE RACK

BACKGROUND OF THE INVENTION

1. Field of the Invention

This invention relates to a rack for connecting a car seat to a stroller frame. More particularly, this invention relates to a retractable rack capable of selectively connecting more than one car seat with different sizes to a stroller frame.

2. Description of the Related Art

A car seat typically has an engagable portion for removably attach to a conventional car seat base. A user can therefore remove the car seat from the car seat base and then subsequently attach the car seat onto the stroller frame so as to transition the child from the car to a stroller without having to remove the child from one seat and place the child in another seat.

A user buys a small car seat for a new born baby or infant, and thereafter needs to buy a larger car seat for grown baby/infant. Therefore, the user then has to buy a larger connector for adapting the new larger car seat to the original stroller frame. This would cause extra expense to buy and the original smaller connector shall be thrown aside.

When a baby grows up, different products are needed for different purposes. Therefore, families spend a large amount of money for buying such products. However, the storage space in their house may be limited. The discard of baby product that is no longer used would cause environmental protection and the waste of resources is concerned.

SUMMARY OF THE INVENTION

In order to reduce the waste of resources by product design, the present invention provides a retractable rack includes a connecting part, a holding mount, a first support element, a second support element and a positioning mechanism.

The connecting part may detachably attach to a stroller frame. The second support element is retractably mounted on the opposite side of the holding mount and capable of selectively locking in a first position and a second position relative to the first support element.

The positioning mechanism is mounted in the holding mount for locking the second support element in the positions. When the second support element is locked in the first position, the retractable rack is capable of supporting and connecting a car seat with a first size, and when the second support element is locked in the second position, the retractable rack is capable of supporting another car seat with a second size to the stroller frame.

Preferably, the second support element may further be provided with a color area, and the holding mount may be provided with a first window and a second window for reveal the color area respectively. By this embodiment, when the second support element is locked in the first position, the color area can be revealed from the first window, and when the second support element is locked in the second position, the color area can be revealed from the second window.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
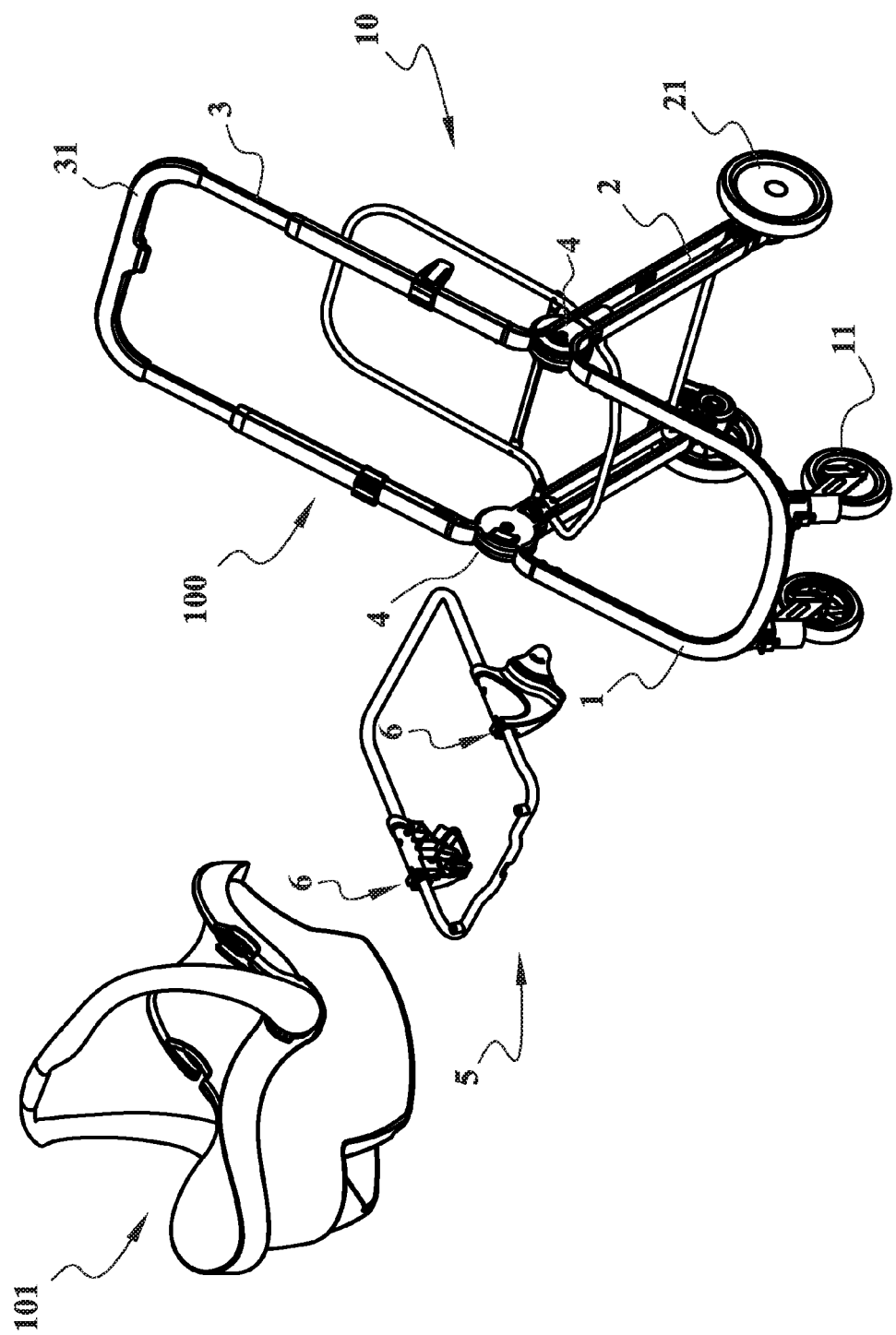
FIG. 1 is a schematic view showing a car seat is to be connected to a stroller frame via an embodiment of the retractable rack according to the present invention.
Figure 6:
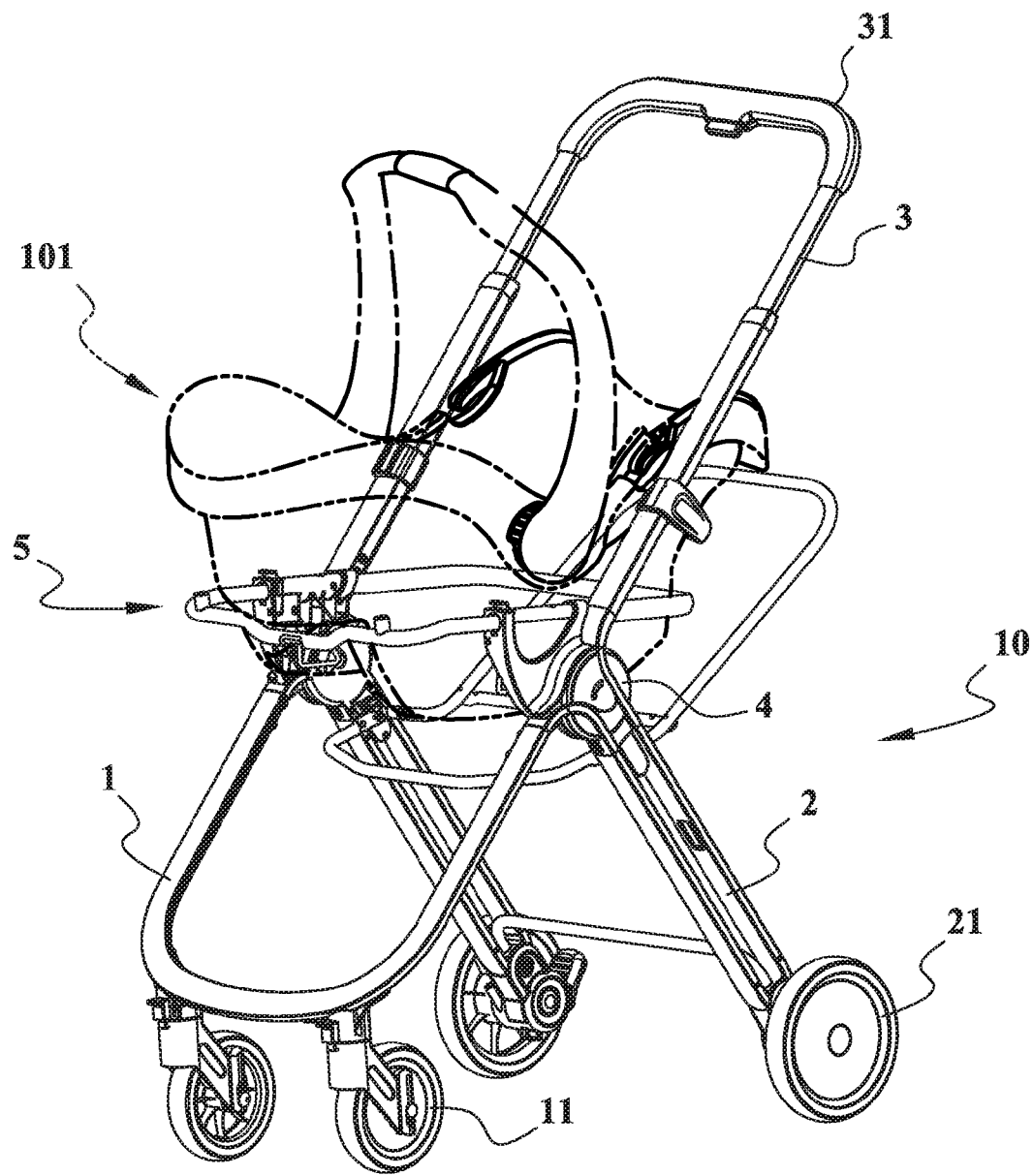
FIG. 6 is a schematic view showing a car seat is connected to a stroller frame via an embodiment of the retractable rack according to the present invention.

Referring to FIGS. 1 and 6, an embodiment of retractable rack 5 according to the present invention is capable of selectively connecting more than one car seat 101 with different sizes to a stroller frame 10. FIG. 1 is a schematic view showing a car seat 101 is to be connected to a stroller frame 10 via the retractable rack 5 according to the present invention. FIG. 6 is a schematic view showing another one car seat 101 with different sizes which may be connected to the same stroller frame 10 via the retractable rack 5.

The stroller frame 10 may be of any traditional styles, for instance, which may include at least a front strut 1 with front wheels 11, a rear strut 2 with a pair of wheels 21, a push arm 3 with a gripping surface 31, and a lockable joint 4 pivoted between the front strut 1, the rear strut 2 and the push arm 3. The stroller frame 10 may be folded into an impact configuration for shipping or transport via vehicle, and erected in a use configuration 100 as shown in FIG. 1 or 6.

Figure 2:
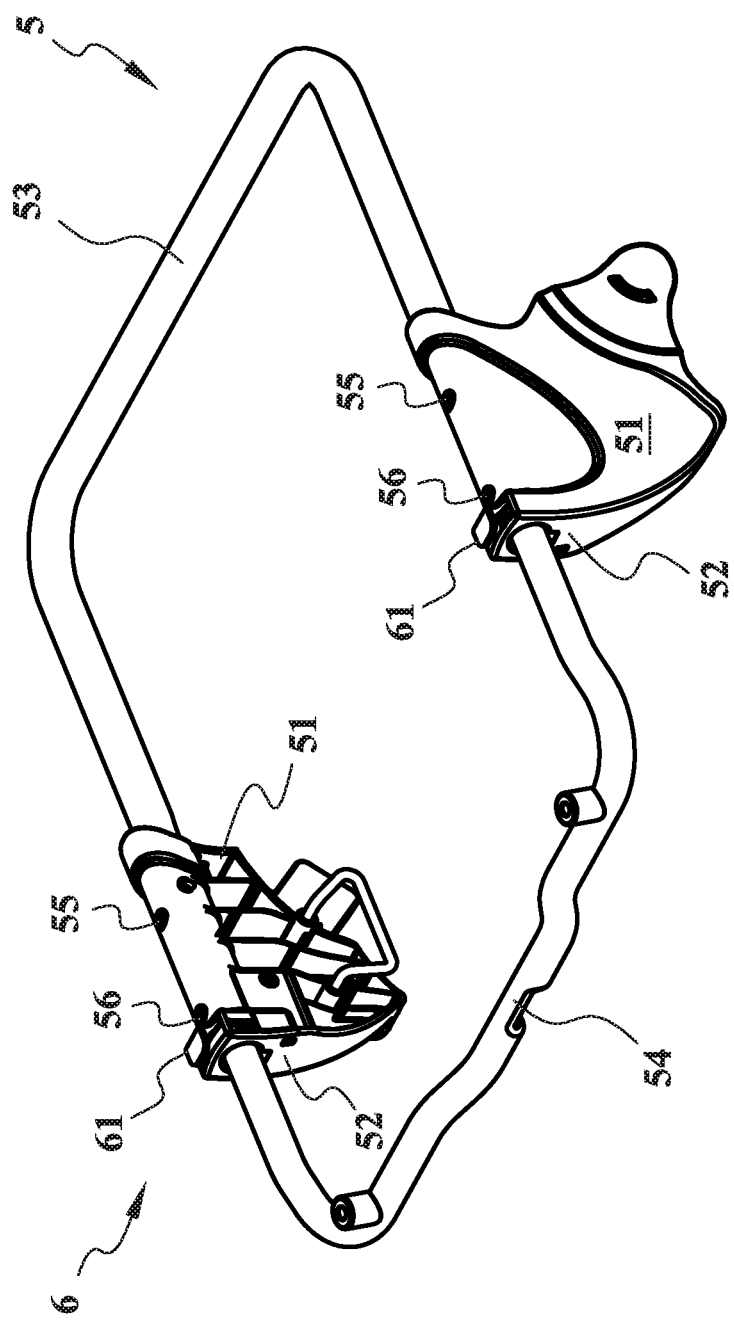
FIG. 2 is a perspective view of the retractable rack of FIG. 1.
Figure 3:
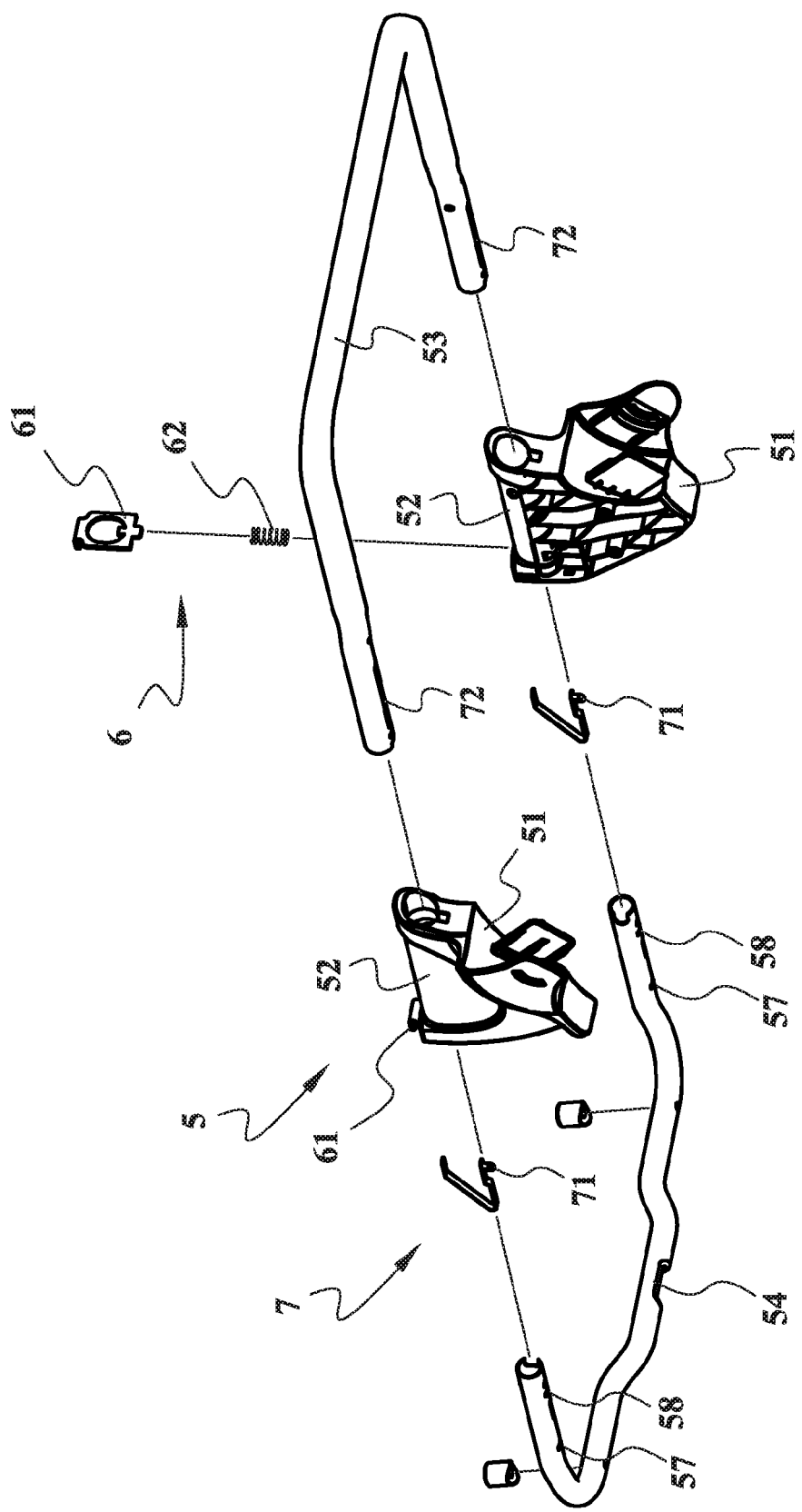
FIG. 3 is an exploded perspective view showing the retractable rack of FIG. 1.
Figure 5:
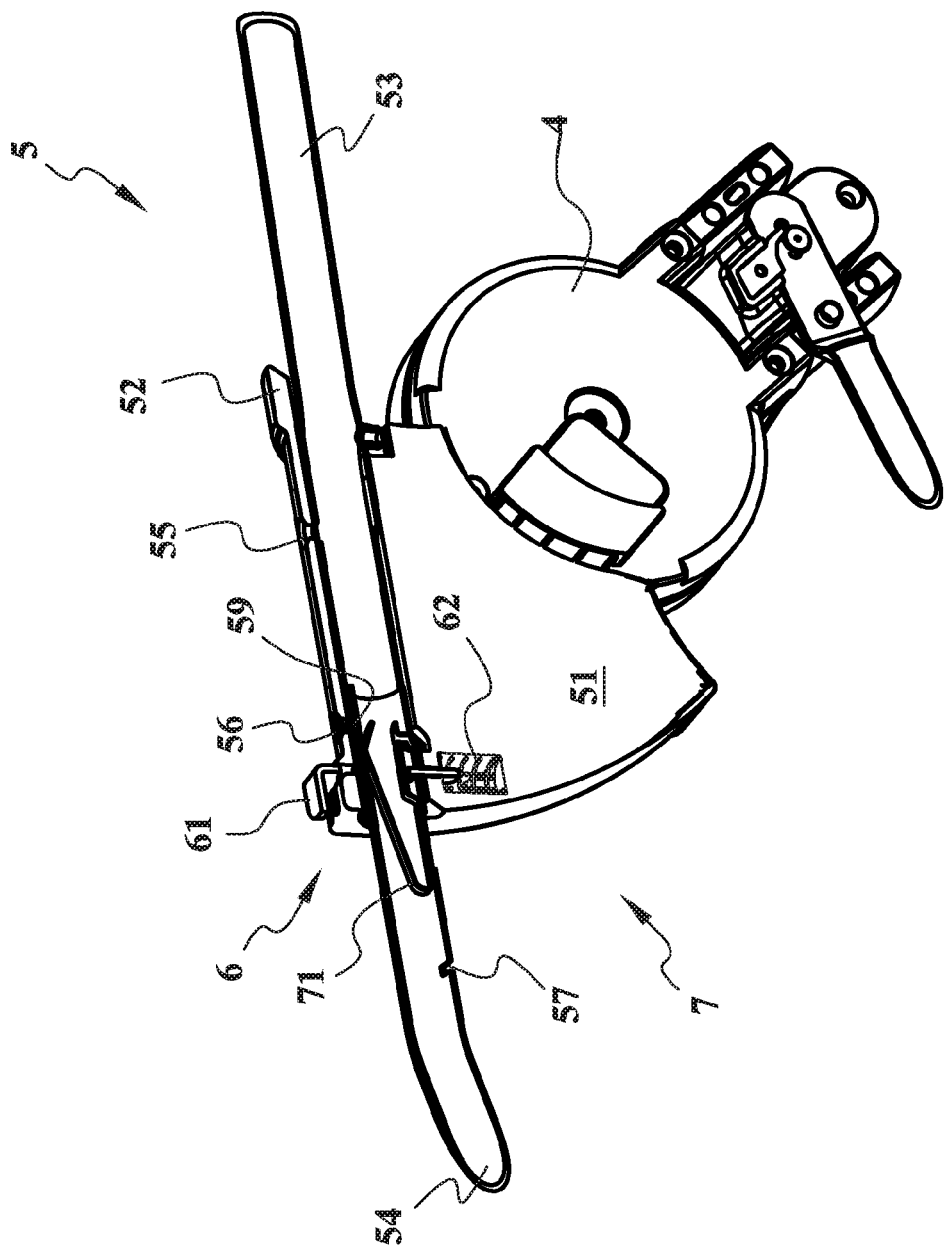
FIG. 5 is a cross-sectional view showing the retractable rack of FIG. 1.

As illustrated in FIGS. 2, 3 and 5, the retractable rack 5 may include at least a connecting part 51, a holding mount 52, a first support element 53, a second support element 54 and a positioning mechanism 6.

The connecting part 51 is use for detachably attaching to the retractable rack 5 to the stroller frame 10. The connecting part 51 and the holding mount 52 may be embodied as two separated parts fixedly attached to one another; however, the connecting part 51 and the holding mount 52 may be alternatively to be formed as a single integral element.

The first support element 53 has one end fixedly connected to one side of the holding mount 52 and has an opposite end extending from the holding mount 52 for supporting one end of the car seat 101.

The second support element 54 has a first positioning portion 57 and a second positioning portion 58 for selectively engaging with the positioning mechanism 6, so as to be selectively locked by the positioning mechanism 6 in one of the first position and the second position. By this way, the second support element 54 is retractably mounted on the opposite side of the holding mount 52 and capable of locking in a first position and a second position relative to the first support element 53, by this way, to support another end of the car seat 101.

Figure 4:
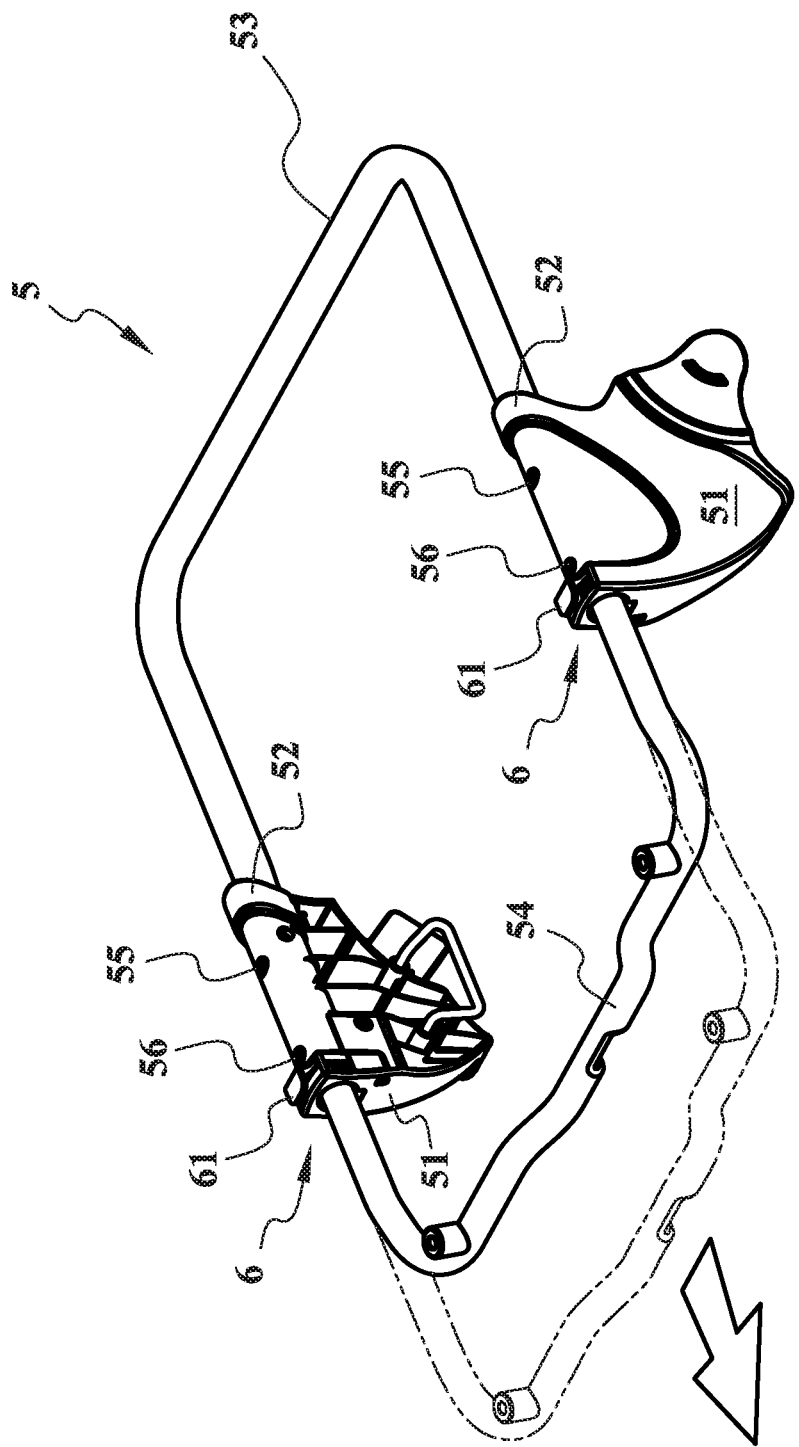
FIG. 4 is a schematic view showing the retractable rack of FIG. 1 can be electively locked in either a first position or a first position for connecting a car seat with different sizes.

In one aspect of the present invention, the second support element 54 may be sleeved within and lockable relative to the holding mount 52 in the first position and the second position. However, the second support element 54 may also be sleeved within and lockable relative to the first support element 53 in the first position and the second position as shown in FIG. 4.

It will be appreciated that retractable rack 5 may further include a retaining apparatus 7 for preventing the second support element 54 from detaching from the holding mount 52 or the first support element 53. Referring to either FIG. 3 or 5, the retaining apparatus 7 may include a spring-biased locking member 71 mounted within and protruded outwardly form the second support element 54. The first support element 53 may formed with a long slot 72 for slidably engaging with the spring-biased locking member 71 so as to keep the second support element 54 can move reciprocally but not to be detachable from the holding mount 52 and the first support element 53.

The positioning mechanism 6 is mounted in the holding mount 52 for selectively locking the second support element 54 in one of the first position and the second position. When the second support element 54 is locked in the first position thereof, the retractable rack 5 is capable of supporting and connecting a car seat 101 with a first size to the stroller frame 10, and when the second support element 54 is locked in the second position thereof, the retractable rack 5 is capable of supporting and connecting another car seat 101 with a second size to the stroller frame 10.

Specifically, the positioning mechanism 6 may be embodied to include a spring-biased positioner 61 operatively mounted in the holding mount 52 for selectively engaging with one of the first positioning portion 57 and the second positioning portion 58 so as to selectively lock the second support element 54 in one of the first position and the second position.

As shown in FIGS. 3 and 5, the spring-biased locking member 71 is passing through a center hole of the spring-biased positioner 61, and the spring-biased positioner 61 is biased by a spring 62 upward to normally engage with one of the first positioning portion 57 and a second positioning portion 58. When the spring-biased locking member 71 is pressed downward, the second support element 54 is unlocked so as to adjust the distance between the opposite end of the first support element 53 and the second support element 54.

Referring also to FIGS. 4 and 5, preferably, the second support element 54 may further be provided with a color area 59, and the holding mount 52 may further be provided with a first window 55 and a second window 56 for reveal the color area 59 respectively. By this embodiment, when the second support element 54 is locked in the first position, the color area 59 can be revealed from the first window 55, and when the second support element 54 is locked in the second position, the color area 59 can be revealed from the second window 56.

As discussed in greater detail hereinabove, the retractable rack 5 according to the present invention is capable of selectively connecting more than one car seat 101 with different sizes to a stroller frame 10. Specifically, the user may assure whether the second support element 54 has been locked in either the positions by checking the color through the window.

While particular embodiments of the invention have been described, those skilled in the art will recognize that many modifications are possible that will achieve the same goals by substantially the same system, device or method, and where those systems, devices or methods still fall within the true spirit and scope of the invention disclosed.

What is claimed is:

1. A retractable rack, for selectively connecting car seats with different sizes to a stroller frame, the retractable rack comprising:
   a connecting part, for detachably attaching the retractable rack to the stroller frame;
   a holding mount, connected with the connecting part;
   a first support element, having one end fixedly connected to one side of the holding mount and having an opposite end extending from the holding mount;
   a second support element, retractably mounted on the opposite side of the holding mount, capable of locking in a first position and a second position relative to the first support element; and
   a positioning mechanism, mounted in the holding mount for selectively locking the second support element in one of the first position and the second position;
   wherein when the second support element is locked in the first position thereof, the retractable rack is capable of supporting and connecting a car seat with a first size to the stroller frame, and when the second support element is locked in the second position thereof, the retractable rack is capable of supporting and connecting another car seat with a second size to the stroller frame, and
   wherein the second support element is sleeved within and lockable relative to the first support element in the first position and the second position.

2. The retractable rack according to claim 1, wherein the second support element has a first positioning portion and a second positioning portion for selectively engaging with the positioning mechanism, so as to be selectively locked by the positioning mechanism in one of the first position and the second position.

3. The retractable rack according to claim 2, wherein the positioning mechanism includes a spring-biased positioner operatively mounted in the holding mount for selectively engaging with one of the first positioning portion and the second positioning portion so as to selectively lock the second support element in one of the first position and the second position.

4. The retractable rack according to claim 1, wherein the connecting part and the holding mount are formed as a single integral element.

5. The retractable rack according to claim 1, wherein the connecting part and the holding mount are two parts fixedly attached to one another.

6. The retractable rack according to claim 1, wherein the second support element is further sleeved within and lockable relative to the holding mount in the first position and the second position.

7. The retractable rack according to claim 1, wherein the second support element has a color area, and the holding mount has a first window and a second window for revealing the color area respectively; wherein when the second support element is locked in the first position, the color area is revealed from the first window, and when the second support element is locked in the second position, the color area is revealed from the second window.

8. A retractable rack, for selectively connecting car seats with different sizes to a stroller frame, the retractable rack comprising:
   a connecting part, for detachably attaching the retractable rack to the stroller frame;
   a holding mount, connected with the connecting part;
   a first support element, having one end fixedly connected to one side of the holding mount and having an opposite end extending from the holding mount;
   a second support element, retractably mounted on the opposite side of the holding mount, capable of locking in a first position and a second position relative to the first support element;

a positioning mechanism, mounted in the holding mount for selectively locking the second support element in one of the first position and the second position; and a retaining apparatus for preventing the second support element from detaching from the holding mount and the first support element;

wherein when the second support element is locked in the first position thereof, the retractable rack is capable of supporting and connecting a car seat with a first size to the stroller frame, and when the second support element is locked in the second position thereof, the retractable rack is capable of supporting and connecting another car seat with a second size to the stroller frame, and wherein the retaining apparatus includes a spring-biased locking member mounted within and protruded outwardly form the second support element, and the first support element is formed with a long slot for slidably engaging with the spring-biased locking member so as to keep the second support element movable but cannot be detached from the holding mount and the first support element.

* * * * *